(12) United States Patent
Zhang

(10) Patent No.: US 9,451,251 B2
(45) Date of Patent: Sep. 20, 2016

(54) SUB PICTURE PARALLEL TRANSCODING

(71) Applicant: Broadcom Corporation, Irvine, CA (US)

(72) Inventor: Lei Zhang, Palo Alto, CA (US)

(73) Assignee: BROADCOM CORPORATION, Irvine, CA (US)

(*) Notice: Subject to any disclaimer, the term of this patent is extended or adjusted under 35 U.S.C. 154(b) by 394 days.

(21) Appl. No.: 13/693,177

(22) Filed: Dec. 4, 2012

(65) Prior Publication Data

US 2014/0146869 A1 May 29, 2014

Related U.S. Application Data

(60) Provisional application No. 61/730,267, filed on Nov. 27, 2012.

(51) Int. Cl.
*H04N 7/26* (2006.01)
*H04N 19/40* (2014.01)
*H04N 19/423* (2014.01)
*H04N 19/436* (2014.01)

(52) U.S. Cl.
CPC ........ *H04N 19/00472* (2013.01); *H04N 19/40* (2014.11); *H04N 19/423* (2014.11); *H04N 19/436* (2014.11)

(58) Field of Classification Search
CPC ................ H04N 19/423; H04N 19/00472; H04N 19/40; H04N 19/436
See application file for complete search history.

(56) References Cited

U.S. PATENT DOCUMENTS

| | | | | |
|---|---|---|---|---|
| 4,688,190 | A * | 8/1987 | Bechtolsheim | 345/538 |
| 7,230,729 | B1 * | 6/2007 | Reardon et al. | 358/1.13 |
| 2002/0152317 | A1 * | 10/2002 | Wang et al. | 709/231 |
| 2003/0012275 | A1 * | 1/2003 | Boice et al. | 375/240.01 |
| 2005/0207497 | A1 * | 9/2005 | Rovati et al. | 375/240.16 |
| 2006/0039461 | A1 * | 2/2006 | Engelmann | 375/240.01 |
| 2006/0159195 | A1 * | 7/2006 | Ionescu et al. | 375/267 |
| 2006/0209950 | A1 * | 9/2006 | Zhu | 375/240.03 |
| 2007/0230902 | A1 * | 10/2007 | Shen et al. | 386/83 |
| 2008/0056358 | A1 * | 3/2008 | Fuchie et al. | 375/240.12 |
| 2008/0158388 | A1 * | 7/2008 | Lahcanski et al. | 348/231.7 |
| 2009/0097548 | A1 * | 4/2009 | Karczewicz et al. | 375/240.03 |
| 2011/0264934 | A1 * | 10/2011 | Branover et al. | 713/320 |

* cited by examiner

*Primary Examiner* — Jay Patel
*Assistant Examiner* — Joseph Suh
(74) *Attorney, Agent, or Firm* — Foley & Lardner LLP; Christopher J. McKenna; Daniel E. Rose

(57) ABSTRACT

A method for transcoding a video file bit stream in parallel at a sub picture latency and faster than real time rate includes writing to a memory a processed raw pixel data stream. The processed raw pixel data stream is expressed as a sequence of pictures. Each picture is divided into a first sub picture partition and a second sub picture partition. A first encoder encodes each first sub picture partition, the first encoder being communicatively coupled to the memory. A second encoder encodes each second sub picture partition, the second encoder being communicatively coupled to the memory.

19 Claims, 4 Drawing Sheets

SUB PICTURE PARALLEL TRANSCODING

CROSS-REFERENCE TO RELATED APPLICATIONS

This application is a utility application that claims priority to U.S. Provisional Patent Application titled, "Sub Picture Transcoding", having Ser. No. 61/730,267, filed Nov. 27, 2012, which is entirely incorporated herein by reference.

BACKGROUND

Media items such as movies, television shows, music, etc. may be digitally stored as video files in various file formats. Video devices that playback these video files may be limited to a set of file formats that are supported by the video device. For example, a video device may not support particular formats such as, for example, high definition, high frame rates, various compression formats, etc. To successfully play back video files in such devices, the video files may need to be transcoded. Video devices may have limited storage capacity, and it may be desirable to transcode video files into a format with a smaller file size. By performing transcoding on a video file, the video file may be converted from an unsupported file format to a supported file format, and the video file may be converted from a larger file size to a smaller file size.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to transcoding a video file to generate a transcoded video file. A video file such as, for example, a television show, a movie, etc., may be stored as a digital file in a variety of formats or a combination of formats. For example, a video file may be encoded in accordance with a particular standard, file format, frame rate, media quality, or any other format for storing a digital video file. Video files stored in an original format may not be suitable for presentation in particular video devices, or they may be too large to store in particular video devices, or for any reason it may be desirable to reduce the size of the video files. Thus, a format conversion is required to modify the video file in order to render it presentable in a target video device or reduce the size of the video file to render it suitable for storage in or transmission to a target video device. Full transcoding may be used to convert a video file from one format to another format. Full transcoding involves completely decoding the video file in a raw format, processing the raw file by performing any number of specified operations, such as scaling or filtering, and encoding the raw video file to a target format.

Various embodiments of the present disclosure are directed to employing a set of encoders to encode portions of pictures of a video file in parallel. Once a video bit stream has been decoded and processed, the bit stream is written into a memory at a particular rate. A set of encoders share the memory by reading from and writing to the memory. Each picture is effectively divided into sub picture partitions, where each sub picture partition is allocated to a corresponding encoder. To this end, each picture is encoded in parallel using multiple encoders. After an encoder encodes a sub picture partition to generate reconstructed pixels, the encoder writes the reconstructed pixels of encoded sub picture partition to a memory that is shared by all parallel encoders. Other encoders may access these reconstructed pixels by reading from the shared memory.

Thus, various embodiments of the present disclosure relate to providing faster-than-real-time transcoding of a video file through the use of a faster-than-real-time-decode system in conjunction with an encoding system that encodes each picture in parallel using sub picture parallel encoding. Each encoder in the encoding system may encode a sub picture at a rate that is slower than real time. However, by aggregating multiple sub picture encoders to encode in parallel, faster-than-real-time transcoding may be achieved.

Figure 1:
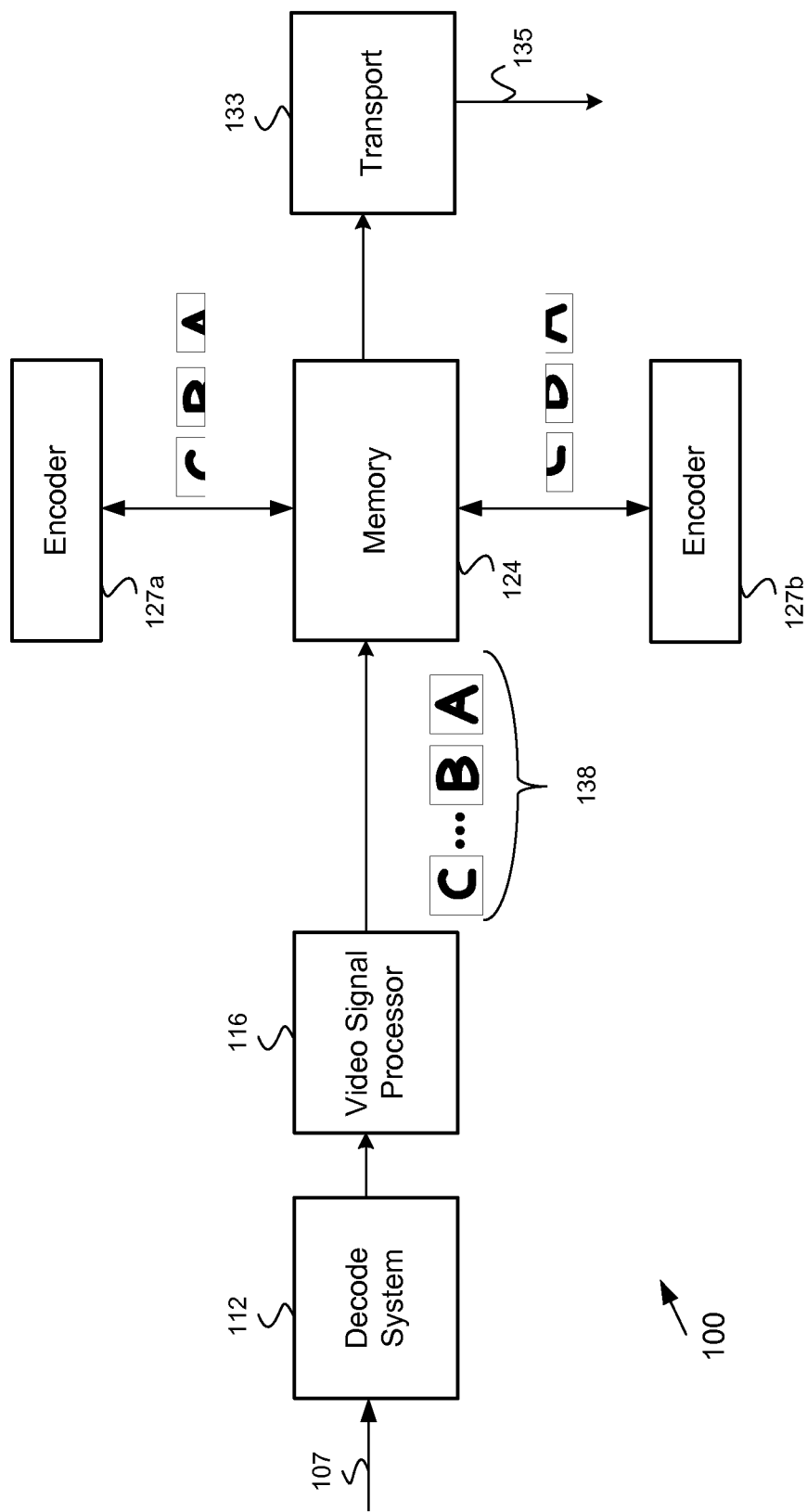
FIG. 1 is a drawing of an example a processing circuitry implementing a transcoding system, in accordance with various embodiments of the present disclosure.

Moving onto FIG. 1, shown is a drawing of an example of processing circuitry 100 implementing a transcoding system, in accordance with various embodiments of the present disclosure. In various embodiments, the processing circuitry 100 is implemented using one or more circuits, one or more microprocessors, application specific integrated circuits, digital signal processors, microcomputers, central processing units, field programmable gate arrays, programmable logic devices, state machines, or any combination thereof. In yet other embodiments, the processing circuitry 100 includes one or more software or hardware modules executable within one or more processing circuits. For example, the processing circuitry 100 includes memory configured to store instructions and/or code that causes the processing circuitry 100 to execute transcoding functions.

The processing circuitry 100 implements a transcoding system that transcodes a video file 107. The processing circuitry 100 comprises various components such as a decode system 112, a video signal processor 116, a memory 124, a set of encoders 127, a transport module 133, or any other component used to transcode a video file 107. The output of the processing circuitry 100 is a compressed video stream 135 that has been decoded, processed, and re-encoded into a video bit stream different from the input video file.

The decode system 112 is configured to decompress a received video file 107. The decode system 112 may comprise one or more decode cores to convert the video file into raw pixel data. The decode system 112, for example, decodes the video file 107 and transmits the raw pixel data to the video signal processor 116 at a rate of N×real time (RT) rate. The RT rate is the rate at which the video file 107 is displayed in raster scan order to a user in real-time display speed, where the rate is expressed as pictures per unit time. For example, a movie may display at 24 pictures per second real-time rate. "N" represents a constant indicating that the decode system 112 decodes the video file 107 at a rate that is faster than real time.

The video signal processor 116 is configured to process the raw pixel data stream of the output of the decode system 112. The video signal processor 116 performs pixel processing functions such as, for example, picture size scaling, interlacing/de-interlacing, color space conversion, noise filtering, frame rate conversion, audio-video synchronizing, and image enhancement. Pixel processing may comprise changing a format. For example, a format change may be high definition (HD) conversion to standard definition (SD) conversion or de-interlacing two fields into one frame. The video signal processor 116 processes the raw pixel data stream at a rate of N×RT rate and writes the processed raw pixel data to the memory 124 at this rate. Accordingly, the video signal processor 116 writes the processed raw pixel data on a per pixel basis according to a sequence of pixels. To this end, the memory 124 absorbs the processed raw pixel stream on a pixel by pixel basis according to a rate of N×RT rate. Furthermore, the processed raw pixel data represents a series of pictures 138, where the series of pictures 138 is made up a sequence of individual pictures 138 such as, for example, picture A, picture B, picture C, etc. Thus, each picture 138 is streamed to the memory 124 in a sequence.

In various embodiments, the memory 124 comprises a computer-readable medium. The computer-readable medium may be a random access memory (RAM) including, for example, static random access memory (SRAM), dynamic random access memory (DRAM), magnetic random access memory (MRAM), or other types of memory. The memory 124 may be a single memory unit that is shared by a set of encoders 127.

The transcoding system implemented by the processing circuitry 100 comprises a first encoder 127a and a second encoder 127b that make up the set of encoders 127. Although the non-limiting example of FIG. 1 depicts a dual encoder system, various embodiments of the present disclosure are not so limited. Each encoder 127 comprises an encoder core that is configured to encode the processed raw pixel data by accessing the memory 124. Each encoder 127 is configured to encode a predetermined portion of each picture 138. The predetermined portion of a picture 138 may be, for example, a top half, a bottom half, a left half, a right half, even rows of macro blocks, odd rows of macro blocks, or any other sub picture partition. In this respect, each encoder 127 is configured to encode the processed raw pixel data for a predetermined pixel range for each picture 138.

Thus, the transcoding system effectively divides each picture 138 into a set of sub picture partitions and allocates each sub picture partition to a corresponding encoder 127. As shown in the non-limiting example of FIG. 1, the first encoder 127a is dedicated to encode the top half of each picture 138 and the second encoder 127b is dedicated to encode the bottom half of each picture 138.

In various embodiments, each encoder 127 is configured by firmware, where the firmware controls the pixel ranges or sub picture partitions that represent a coding unit such as, for example, a macro block in AVC/H.264 video coding standard or a coding tree block in a High Efficiency Video Coding (HEVC) video coding standard, to be encoded by each encoder 127. For example, the firmware specifies a usage mode that indicates a sub picture partition scheme. The usage mode may instruct a particular encoder 127 to encode a particular range or particular ranges of pixels that corresponds to a sub picture partition. The usage mode may specify dividing each picture 138 into halves, the orientation of the halves, or any other manner for dividing a picture 138 into sub picture partitions. In various embodiments, the usage mode is configured to be modified to allow for different sub picture partition schemes.

Each encoder may read from the memory 124 at a rate of N/M×RT rate, where M represents the number of encoders in the transcoding system. In this respect, each encoder 127 encodes a respective sub picture partition at a rate that is slower than the rate at which the processed raw pixel data stream is written to the memory 124. However, through the use of multiple encoders 127 in parallel, the effective encoding rate based on aggregating the set of encoders 127 is equivalent to the rate of N×RT rate. To this end, a faster than RT rate may be achieved by the transcoding system.

Figure 2:
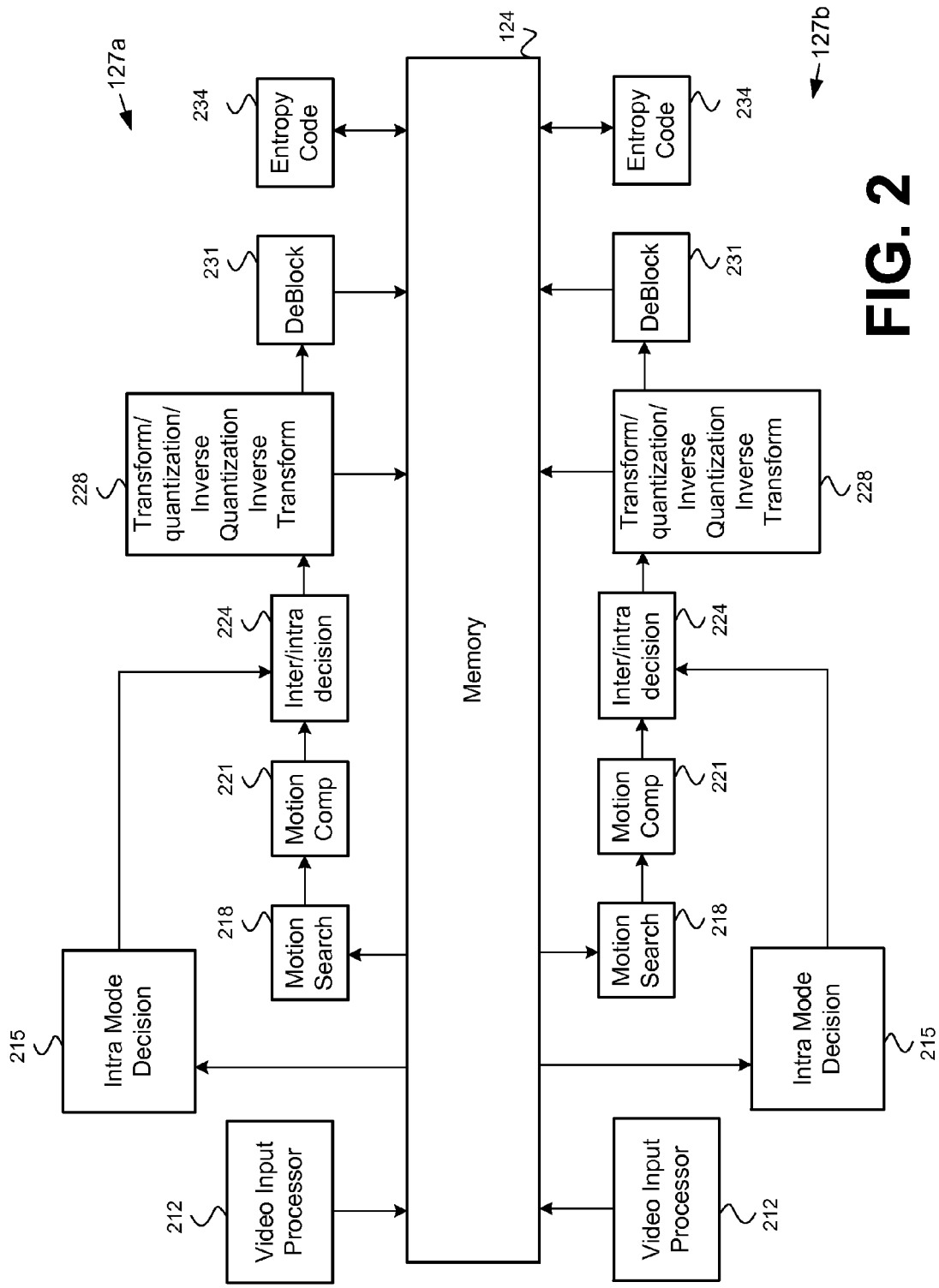
FIG. 2 is a diagram of an example of a set of encoders within the processing circuitry of FIG. 1, in accordance with various embodiments.

FIG. 2 is a diagram of an example of a set of encoders 127 within the processing circuitry of FIG. 1, in accordance with various embodiments. FIG. 2 depicts a non-limiting example of using a first encoder 127a and a second encoder 127b to process an individual picture 138 (FIG. 1) in parallel. The first encoder 127a is dedicated to encode a first sub picture partition of a particular picture and the second encoder 127b is dedicated to encode a second sub picture partition of the particular picture.

Each encoder 127 comprises a video input processor 212, an intra mode decision module 215, a motion search module, a motion compensation module 221, and inter/intra decision module, a transform/quantization/inverse quantization/inverse transform (TQ/IQIT) module 228, a deblock module 231, and an entropy code module 234. Various modules of each transcoder may read from or write to the memory 124. Although each encoder 127 encodes a predetermined constituent sub picture partition, each encoder 127 may access data outputs generated by other encoders 127 as other encoders 127 write to the shared memory 124. The data outputs may comprise reconstructed pixels.

The video input processor 212 of each encoder 127 reads the memory 124 to gather some statistics of input video, or perform further picture rescaling for encoding purpose, and determine whether to handle the processed raw pixel data in a progressive mode or interlaced mode. The intra mode decision module 215 reads groups of pixels from the memory 124. For example, the intra mode decision module 215 may access the memory 124 on a per coding unit bases, where a coding unit comprises a predefined pixel height and pixel width such as a macro block of 16×16 in AVC or a coding tree block of 64×64 in HEVC. The intra mode decision module 215 determines prediction of the pixels of the coding unit presently subject to encoding by reconstructed pixels of its neighboring coding unit of the picture 138 that is presently subject to encoding.

The motion search module 218 and motion compensation module 221 operate together to determine an inter-prediction. The motion search module 218 analyzes various motions vectors associated with the coding unit of the picture 138 that is currently subject to encoding. To identify motion vectors, the motion search module 218 may access portions of reconstructed pixels of previously processed pictures 138 regardless of whether such portions were encoded by the first encoder 127a or by second encoder 127b. That is to say, portions of the previous processed pictures 138 are written into the memory 124 and are shared by the encoders 127. The motion search module 218 identifies and transmits motion vectors to the motion compensation module 221. According to various embodiments, the pixel search ranges used by the motion search module 218 is limited to account for reconstructed pixels that have already been processed by an encoder 127. This may be reconstructed pixels associated with previously encoded pictures 138. Next, the motion compensation module 221 uses the pixels associated with the identified motion vectors to determine differences associated with the input raw pixels. The output of the motion compensation module 221 is fed to the inter/intra decision module 224.

The inter/intra decision module 224 compares the results from the intra mode decision module 215 and the motion compensation module 221 to determine whether to apply an inter-prediction or intra-prediction. The inter/intra decision module 224 determines an error or residual based on comparing the inter-prediction and intra-prediction. In various embodiments, the inter/intra decision module 224 generates decisions on a per coding unit basis.

The TQ/IQIT module 228 uses the residual data from either the inter-prediction or intra-prediction mode to compress the data. The TQ/IQIT module 228 further determines and applies quantization parameters to the data. The results of TQ (Transform and Quantization), i.e. quantized transform coefficients, are written to the memory 124 for the entropy code module 234 to read. The deblock module 231 performs filtering operations to remove potential artifacts reflected in the data. The output of the deblock module 231 comprises reconstructed pixels associated with the sub picture partition processed by a corresponding encoder 127. The reconstructed pixels may be accessed by the various encoders 127 for encoding subsequent pictures. The entropy code module 234 analyzes redundancy associated with the output of the TQ/IQIT module 228.

As shown in the non-limiting example of FIG. 2, an encoder 127a is dedicated to encode a particular sub picture partition, however, the encoder 127a uses reconstructed pixels generated from the same encoder 127a or from other encoders 127b. For example, a first encoder 127a is dedicated to encode a first half of a picture 138, however the first encoder 127a may use/apply reconstructed pixels associated with the bottom half of the same picture given that the second encoder 127b has generated the reconstructed pixels of the bottom half of the pixels. Furthermore, the first encoder 127a may use/apply reconstructed pixels associated with previously encoded pictures from either the first encoder 127a or the second encoder 127b for performing a motion search operation or motion compensation operation.

Figure 3:
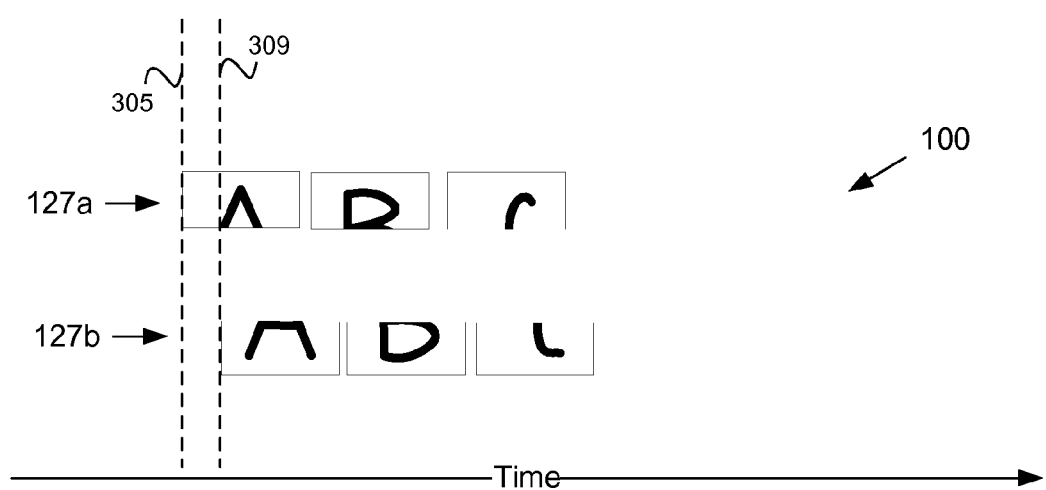
FIG. 3 is a diagram of an example of an operation performed by encoders within the processing circuitry of FIG. 1, in accordance with various embodiments.

Turning to FIG. 3, shown is a diagram of an example of the operation performed by encoders 127 within the processing circuitry 100 of FIG. 1, in accordance with various embodiments. FIG. 3 depicts a first encoder 127a that is dedicated to encode a first sub picture partition of a particular picture and the second encoder 127b is dedicated to encode a second sub picture partition of the particular picture. Specifically, the first encoder 127a processes the top half of each picture 138 and the second encoder processes the bottom half of each corresponding picture 138.

A video signal processor 116 (FIG. 1) writes a bit stream of processed raw pixel data to a memory 124 (FIG. 1) at a relatively rapid rate. The first encoder 127a and second encoder 127b may read the processed raw pixel data from the memory 124 at a relatively slower rate. As the video signal processor 116 writes data to the memory 124 as a stream of pixels, the pixels associated with the top half of the picture 138 are available before the pixels associated with the bottom half of the picture 138 are available. The first encoder 127a is configured to begin encoding the top half of the first picture at a first point in time 305. For example, once the first macro block of the top half of the picture has been written into the memory 124, the first encoder 127a begins encoding the first macro block.

As shown in the non-limiting example of FIG. 3, the second encoder 127b is initially idle because processed raw pixels associated with bottom half of the picture have yet to be written to the memory 124. Once the video signal processor 116 writes the first few processed raw pixels to the memory 124, the second encoder 127b begins to process these pixels at a second point in time 309. The second point in time 309 may indicate a point in time when the first macro block of the bottom half of a picture is available for encoding by the second encoder 127b.

In this respect, the encoding start times for the encoders 127 are staggered by the difference between the first point of time 305 and the second point of time 309. Put another way, the memory 124 is configured to transmit the top half of a picture to the first encoder 127a before transmitting the bottom half of the picture to the second encoder 127b. Furthermore, although the start times are staggered, the first encoder 127a and the second encoder 127b are configured to simultaneously encode respective portions of a first picture.

As the first encoder 127a encodes the last few macro blocks of the top half of the picture, the first encoder 127a may use reconstructed pixels associated with the bottom half of the picture that have been processed by the second encoder 127b after the second point in time 309.

Figure 4:
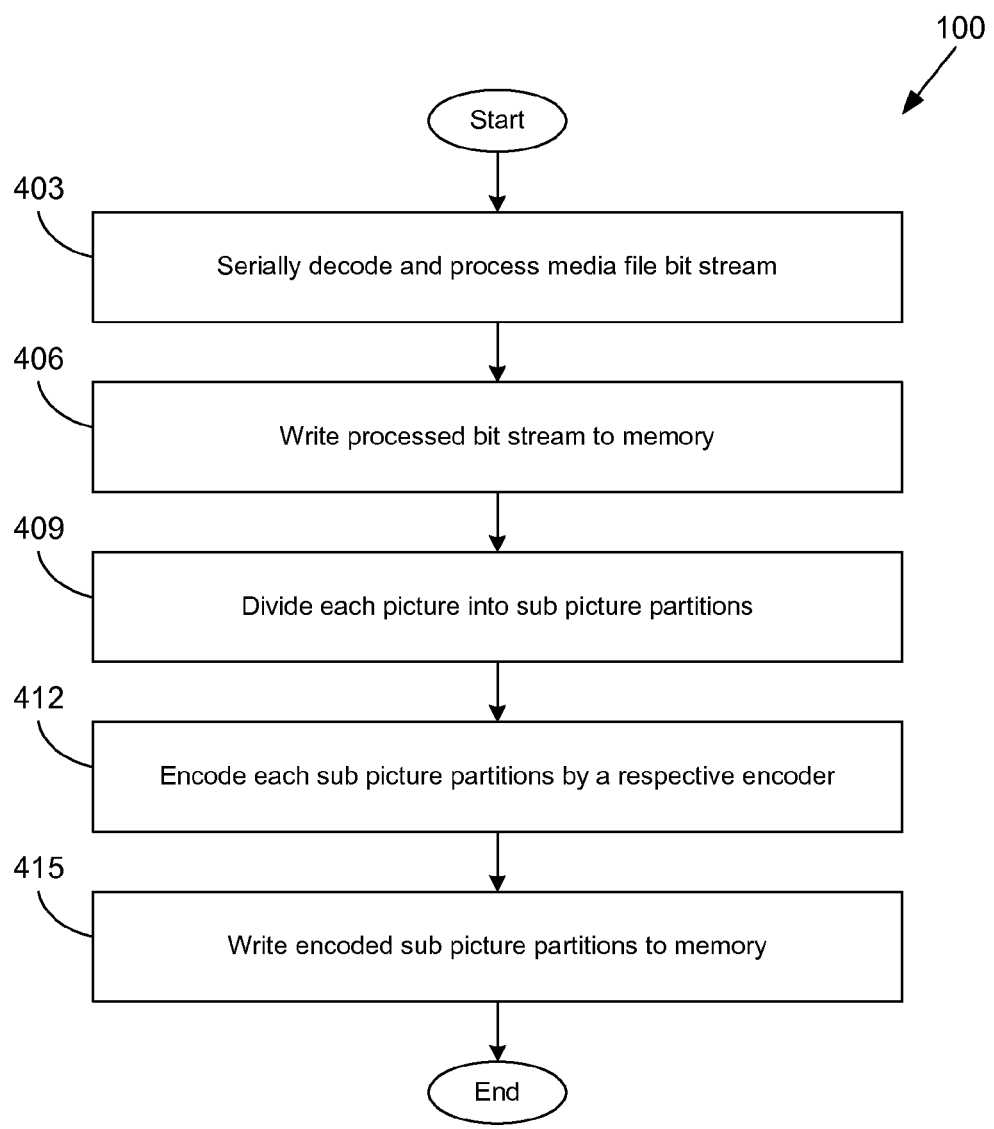
FIG. 4 is a flowchart illustrating an example of functionality implemented as portions of the processing circuitry of FIG. 1, in accordance with various embodiments of the present disclosure.

Referring next to FIG. 4, shown is a flowchart illustrating examples of functionality implemented as portions of the processing circuitry 100 of FIG. 1, in accordance with various embodiments of the present disclosure. It is understood that the flowchart of FIG. 4 provides merely an example of the many different types of functional arrangements that may be employed to implement the operation of the processing circuitry 100 as described herein. As an alternative, the flowchart of FIG. 4 may be viewed as depicting an example of steps of a method implemented in the processing circuitry 100 according to one or more embodiments.

To begin, at reference number 403, the processing circuitry 100 serially decodes and processes a video file bit stream. In this respect, each picture in the video bit stream is processed in a particular sequence. The processing circuitry 100 employs a decode system 112 (FIG. 1) to decode and/or decompress a video file 107 (FIG. 1). The output of the decode system 112 is a stream of raw pixel data. The processing circuitry 100 employs a video signal processor 116 (FIG. 1) to perform one or more pixel operations on the raw pixel data to generate processed raw pixel data.

At reference number 406, the processing circuitry 100 writes the processed pixel data to a memory 124 (FIG. 1). For example, the video signal processor 116 writes the processed raw pixel stream to the memory at a relatively faster rate than the real time pixel display rate. In various embodiments, each pixel is written to the memory in a sequential order as the video signal processor 116 processes the raw pixel data in series.

At reference number 409, the processing circuitry 100 divides each picture into sub picture partitions such as, for example, a first sub picture partition and a second sub picture partition. Thus, the processed raw pixel data stored in the memory 124 is effectively partitioned into sub picture partitions. For example, the processing circuitry 100 employs firmware that instructs a set of encoders 127 (FIG. 1) to read sub picture partitions from the memory 124. In this respect, the processing circuitry 100 feeds a set of sub picture partitions to corresponding encoders 127, where the set of sub picture partitions make up a single picture. For example, each encoder 127 may be dedicated to processes a particular sub picture partition.

In various embodiments, dividing each picture comprises dividing each picture into a top half and a bottom half. In this case, a first sub picture partition that comprises the top half of a corresponding picture is fed to a first encoder 127a (FIG. 1) and a second sub picture partition that comprises the bottom half of the corresponding picture is fed to a second encoder 127b (FIG. 1). In other embodiments, the first sub picture partition comprises even macro block rows of a corresponding picture, and the second sub picture partition comprises odd macro block rows of the corresponding picture.

Moreover, a picture may be divided into a set of constituent sub picture partitions dependent or independent of slice boundaries associated with the picture. A particular picture may be associated with slice boundaries during the encoding process. The encoders 127 that encode a corresponding sub picture partition are configured to identify the sub picture partition based on a predetermined pixel range. That is to say, a particular encoder 127 is dedicated to operate on a pixel range or pixel ranges of each picture. The division of these pixel ranges is determined by the firmware and is dependent or independent of slice boundaries that may be associated with a picture. Thus, the first sub picture partition may comprise a plurality of slices of a picture, and the second sub picture partition may also comprise a plurality of slices of the picture.

At reference number 412, the processing circuitry 100 encodes each sub picture partition using a respective encoder 127. Each encoder 127 may read processed raw pixel data from a shared memory 124 and encode the processed raw pixel data. For a given encoder 127, the encoding process is limited to a particular sub picture partition, where the sub picture partition is expressed as a range of pixels. However, an encoder 127 may read reconstructed pixel data from the shared memory to perform various encoding operations such as, for example, motion search and motion compensation.

At reference number 415, the processing circuitry 100 writes the encoded sub picture partitions to the memory 124. For example, each encoder writes the corresponding output to the shared memory 124, where the corresponding output comprises the reconstructed pixel data and quantized transform coefficients. This reconstructed pixel data may be used by various encoders 127 for encoding a presently encoded picture or pictures that are to be subsequently encoded. The quantized transform coefficients are further compressed by the entropy code module 234.

The flowchart of FIG. 4 shows the functionality and operation of an implementation of another portion of processing circuitry 100. If embodied in software, each item may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processing circuitry 100. The machine code may be converted from the source code, etc. If embodied in hardware, each item may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, code or instructions to execute portions of the processing circuitry 100, can be embodied in any non-transitory computer-readable medium for use by or in connection with an instruction execution system such as, for example, the processing circuitry 100 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method, comprising:
   writing a pixel bit stream to a memory, the pixel bit stream representing a sequence of frames;
   dividing each frame of the sequence of frames into a first sub frame partition and a second sub frame partition in a spatial domain, each frame comprising a set of contiguous pixels;
   encoding, by a first encoder, the first sub frame partition of each frame, the first encoder being communicatively coupled to the memory;
   decoding the first sub frame partition to generate reconstructed pixels of the first sub frame partition;
   writing the reconstructed pixels of the first sub frame partition of each frame to the memory; and
   encoding, by a second encoder subsequent to writing the reconstructed pixels of the first sub frame partition of each frame to the memory, the second sub frame partition of each frame using each of the reconstructed pixels of the first sub frame partition of the same frame, the second encoder being communicatively coupled to the memory.

2. The method of claim 1, wherein the memory comprises a dynamic random-access memory (DRAM) unit.

3. The method of claim 1,
wherein dividing each frame comprises dividing each frame into a top half and a bottom half,
wherein the first sub frame partition comprises the top half of a corresponding frame,
wherein the second sub frame partition comprises the bottom half of the corresponding frame.

4. The method of claim 1,
wherein the first sub frame partition comprises even macro block rows of a corresponding frame,
wherein the second sub frame partition comprises odd macro block rows of the corresponding frame.

5. The method of claim 1,
wherein the first sub frame partition comprises a plurality of slices of a corresponding frame,
wherein the second sub frame partition comprises a plurality of slices of the corresponding frame.

6. The method of claim 1, wherein the method further comprises transmitting the first sub frame partition of a corresponding frame to the first encoder before transmitting the second sub frame partition of the corresponding frame to the second encoder.

7. The method of claim 1, further comprising:
motion searching, by the second encoder, portions of reconstructed pixels of both the first sub frame partition and the second sub frame partition of the frame.

8. A system, comprising:
a video signal processor being configured to write a series of frames to a memory;
a first encoder being communicatively coupled to the memory, the first encoder being configured to encode a first sub frame partition in a spatial domain of each frame of the sequence of frames stored in the memory, decode the encoded first sub frame partition to generate reconstructed pixels, and write the reconstructed pixels of the first sub frame partition of a frame to the memory, each frame comprising a set of contiguous pixels; and
a second encoder being communicatively coupled to the memory, the second encoder being configured to encode a second sub frame partition in the spatial domain of each frame stored in the memory using each of the reconstructed pixels of the first sub frame partition of the same frame, subsequent to the first encoder writing the reconstructed pixels of the first sub frame partition of the same frame to the memory.

9. The system of claim 8, wherein the first encoder and the second encoder are configured to encode portions of each frame according to a usage mode, the usage mode being expressed in firmware, wherein each frame is divided according to the usage mode for encoding.

10. The system of claim 9, wherein the video signal processor is configured to write the series of frames to the memory at a rate that exceeds a real time frame display rate.

11. The system of claim 9, wherein the usage mode specifies dividing each frame into a first half and a second half, wherein the first sub frame partition comprises the first half, wherein the second sub frame partition comprises the second half.

12. The system of claim 8, wherein the system further comprises a decoder device, the decoder device being configured to serially decode the series of frames.

13. The system of claim 8, wherein the first encoder and the second encoder are configured to simultaneously encode respective portions of a first frame.

14. A system, comprising:
processing circuitry configured to:
store a series of frames in a memory;
divide, in a spatial domain, each frame of the series of frames into a set of constituent sub frame partitions according to a usage mode, each frame comprising a set of contiguous pixels;
allocate each respective sub frame partition to a corresponding one of a plurality of encoders, each encoder being configured to share the memory;
cause a first one and a second one of the plurality of encoders to encode the sub frame partitions respectively allocated to the first encoder and the second encoder, the second encoder beginning after the first encoder; and
cause the second encoder to motion search a portion of reconstructed pixels of the sub frame partition encoded by the first encoder for encoding the sub frame partition of the same frame allocated to the second encoder, the first encoder decoding the sub frame partition to generate reconstructed pixels and storing the reconstructed pixels in the memory.

15. The system of claim 14, wherein the usage mode is configured to be modified.

16. The system of claim 14, wherein each encoder is configured to write a corresponding output to the memory.

17. The system of claim 14, wherein the plurality of encoders are configured to simultaneously encode respective portions of one of the frames.

18. The system of claim 14, wherein the processing circuitry comprises a decoder for serially decoding each frame in the series of frames.

19. The system of claim 14, wherein the usage mode specifies dividing each frame into a set of constituent sub frame partitions independent of slice boundaries associated with the frame.

* * * * *